US012789610B2

(12) United States Patent
Parker et al.

(10) Patent No.: US 12,789,610 B2
(45) Date of Patent: Nov. 10, 2026

(54) ELECTRIC REFUSE VEHICLE POWER MANAGEMENT

(71) Applicant: The Heil Co., Chattanooga, TN (US)

(72) Inventors: Brian T. Parker, Signal Mountain, TN (US); Savannah G. Chandler, Chattanooga, TN (US); Brian Huston Ham, Huntsville, AL (US); Stanley L. Maroney, Attalla, AL (US); Rebecca B. Palmer, Chattanooga, TN (US); Michael Shane Peek, Pisgah, AL (US); John Forrest Smith, Fort Payne, AL (US); Bryan Stewart, Chattanooga, TN (US)

(73) Assignee: The Heil Co., Chattanooga, TN (US)

( * ) Notice: Subject to any disclaimer, the term of this patent is extended or adjusted under 35 U.S.C. 154(b) by 754 days.

(21) Appl. No.: 17/852,241

(22) Filed: Jun. 28, 2022

(65) Prior Publication Data

US 2022/0410688 A1 Dec. 29, 2022

Related U.S. Application Data

(60) Provisional application No. 63/231,071, filed on Aug. 9, 2021, provisional application No. 63/216,370, filed on Jun. 29, 2021.

(51) Int. Cl.
*B60K 1/04* (2019.01)
*B60K 15/03* (2006.01)
(Continued)

(52) U.S. Cl.
CPC .......... *B60K 1/04* (2013.01); *B60K 15/03006* (2013.01); *B60L 1/00* (2013.01);
(Continued)

(58) Field of Classification Search
None
See application file for complete search history.

(56) References Cited

U.S. PATENT DOCUMENTS

2012/0280481 A1 11/2012 Gentry
2014/0343801 A1 11/2014 Whitfield, Jr. et al.
(Continued)

FOREIGN PATENT DOCUMENTS

DE 9105772 U 9/1991
DE 202015008797 U 3/2017
(Continued)

OTHER PUBLICATIONS

International Search Report and Written Opinion in International Appln. No. PCT/US2022/073202, dated Sep. 23, 2022, 10 pages.
(Continued)

*Primary Examiner* — Katy M Ebner
(74) *Attorney, Agent, or Firm* — Fish & Richardson P.C.

(57) ABSTRACT

A refuse vehicle includes a vehicle chassis and an all-electric vehicle body on the chassis. The body includes a hopper, a refuse storage container, and a plurality of electrically powered body systems. The body systems include an electrically actuated tailgate, an electrically actuated refuse loading assembly, and an electrically actuated refuse packing assembly configured to remove refuse from the hopper and to pack said refuse in the storage container. The vehicle (e.g., vehicle body) further includes a power management module configured to regulate energy usage of the body systems and/or to record and track electrical energy usage in the body systems.

32 Claims, 8 Drawing Sheets

(51) Int. Cl.

| | |
|---|---|
| ***B60L 1/00*** | (2006.01) |
| ***B60L 3/00*** | (2019.01) |
| ***B60L 8/00*** | (2006.01) |
| ***B60L 50/61*** | (2019.01) |
| ***B60L 58/14*** | (2019.01) |
| ***B60P 1/50*** | (2006.01) |
| ***B65F 3/02*** | (2006.01) |

(52) U.S. Cl.

CPC ............. *B60L 3/0046* (2013.01); *B60L 8/003* (2013.01); *B60L 8/006* (2013.01); *B60L 50/61* (2019.02); *B60L 58/14* (2019.02); *B60P 1/50* (2013.01); *B65F 3/02* (2013.01); *B60K 2001/0438* (2013.01); *B65F 2003/022* (2013.01); *B65F 2003/0269* (2013.01); *B65F 2003/0279* (2013.01)

(56) References Cited

U.S. PATENT DOCUMENTS

| | | | |
|---|---|---|---|
| 2016/0096411 | A1 | 4/2016 | Eisenhour |
| 2017/0106746 | A1 | 4/2017 | McKinney |
| 2019/0019167 | A1* | 1/2019 | Candel ...................... B65F 3/14 |
| 2020/0247609 | A1 | 8/2020 | Maroney et al. |
| 2020/0346556 | A1* | 11/2020 | Rocholl ................. B60L 53/80 |
| 2020/0346557 | A1* | 11/2020 | Rocholl ............. G01R 31/3648 |
| 2020/0346855 | A1 | 11/2020 | Rocholl et al. |
| 2020/0346856 | A1 | 11/2020 | Rocholl et al. |
| 2020/0346859 | A1 | 11/2020 | Buege et al. |
| 2020/0346862 | A1 | 11/2020 | Rocholl et al. |
| 2020/0399057 | A1 | 12/2020 | Rochell et al. |
| 2021/0031611 | A1 | 2/2021 | Yakes et al. |
| 2021/0031612 | A1 | 2/2021 | Yakes et al. |
| 2021/0323436 | A1 | 10/2021 | Rocholl et al. |
| 2021/0323437 | A1 | 10/2021 | Rocholl et al. |
| 2021/0323438 | A1 | 10/2021 | Rocholl et al. |
| 2021/0339648 | A1 | 11/2021 | Koga et al. |
| 2022/0097555 | A1 | 3/2022 | Koga et al. |
| 2022/0097633 | A1 | 3/2022 | Koga et al. |
| 2022/0105827 | A1 | 4/2022 | Rocholl et al. |
| 2022/0106114 | A1 | 4/2022 | Buege et al. |
| 2022/0106115 | A1 | 4/2022 | Buege et al. |
| 2022/0169444 | A1 | 6/2022 | Rocholl et al. |

FOREIGN PATENT DOCUMENTS

| | | | | |
|---|---|---|---|---|
| DE | 202011004125 | U | 5/2020 | |
| DE | 102019131986 | U | 5/2021 | |
| EP | 3483092 | A1 * | 5/2019 | ................ B65F 3/20 |

OTHER PUBLICATIONS

Extended European Search Report in European Appln No. 22834385.1, mailed on Oct. 1, 2024, 9 pages.

International Preliminary Report on Patentability in International Appln. No. PCT/US2022/073202, dated Jan. 11, 2024, 8 pages.

Extended European Search Report in European Appln No. 25211797.3, mailed on Apr. 8, 2026, 6 pages.

Office Action in Mexican Appln. No. MX/a/2023/015563, mailed on Jan. 16, 2026, 6 pages (with English machine translation).

Office Action in European Appln. No. 22834385.1 mailed on, Jul. 9, 2026, 9 pages (with English machine translation).

* cited by examiner

ELECTRIC REFUSE VEHICLE POWER MANAGEMENT

CROSS REFERENCE TO RELATED APPLICATIONS

This application claims the benefit under 35 U.S.C. § 119(e) of U.S. Patent Application No. 63/216,370, entitled "Electric Refuse Vehicle Power Management," filed Jun. 29, 2021 and U.S. Patent Application No. 63/231,071, entitled "Electric Refuse Vehicle Power Management," filed Aug. 9, 2021, which are incorporated herein by reference in their entirety.

FIELD OF THE INVENTION

Disclosed embodiments relate generally to refuse collection vehicles and more particularly to electrically powered refuse vehicles employing a power management module.

BACKGROUND INFORMATION

Refuse vehicles have long serviced homes and businesses in urban, residential, and rural areas. Collected waste is commonly transported to a landfill, an incinerator, a recycling plant, or some other facility. Refuse vehicles commonly include numerous vehicle body systems to perform vital vehicle functions. Such systems commonly include a refuse collection system, such as front load and side load assemblies, a refuse packing (or compaction) and ejector assembly, and a tailgate open and close assembly.

Historically, refuse vehicles have employed diesel powered engines to propel the vehicle and a power takeoff (PTO) that provides hydraulic actuation of the above noted vehicle body systems. While such refuse vehicles have long been serviceable, there is a need for further improvements. For example, such vehicles are believed to be damaging to the environment, particularly in concentrated urban and suburban areas. Diesel exhaust may be problematic in such areas. Moreover, hydraulic systems tend to leak and can be expensive, difficult to service, and prone to failure in cold temperatures. For these and other reasons, there is a developing demand for all electric or partially electric refuse vehicles (e.g., to eliminate hydraulic actuators).

SUMMARY

One aspect of the present disclosure features a refuse vehicle including: a vehicle chassis, the chassis including a chassis frame, a liquid natural gas or a compressed natural gas fuel storage tank, and a natural gas powered internal combustion engine; and an all-electric vehicle body on the chassis, the body including a refuse container and further including electrically powered body systems, the body systems including an electrically actuated tailgate, an electrically actuated refuse loading assembly, and an electrically actuated refuse packing assembly, the vehicle body further including at least one rechargeable battery pack configured to provide electric power to the body systems.

In some embodiments, the battery pack is deployed on an underside of vehicle body between adjacent rails in the chassis frame.

In some embodiments, the internal combustion engine further includes an alternator electrically connected with and configured to recharge the battery pack.

In some embodiments, the electrically actuated refuse loading assembly includes an electrically actuated front loader including an electrically actuated fork and an electrically actuated loader arm configured to load refuse into the vehicle body.

In some embodiments, the refuse vehicle further includes a carry can coupled to the electrically actuated front loader, the carry can further include an electrically actuated arm and an electrically actuated grabber configured to load refuse into the carry can.

In some embodiments, the electrically actuated refuse loading assembly includes an electrically actuated side loader including an electrically actuated side arm and an electrically actuated grabber configured to load refuse into the vehicle body.

In some embodiments, the electrically actuated refuse loading assembly includes an electrically actuated rear loader assembly configured to load refuse into the vehicle body.

In some embodiments, the vehicle body does not include any hydraulically powered components.

In some embodiments, the vehicle body further includes a power management module configured to regulate energy usage of the body systems and/or record and track electrical energy usage in each of the body systems.

Another aspect of the present disclosure features a refuse vehicle including: a vehicle chassis; an all-electric vehicle body on the chassis, the body including a hopper and a refuse storage container, the body including electrically powered body systems, the body systems including an electrically actuated tailgate, an electrically actuated refuse loading assembly, and an electrically actuated refuse packing assembly configured to remove refuse from the hopper and to pack said refuse in the storage container; and a power management module configured to regulate energy usage of the body systems and/or record and track electrical energy usage in each of the body systems.

In some embodiments, the power management module is configured to estimate a quantity of refuse in the hopper and to trigger the refuse packing assembly to remove the refuse from the hopper and to pack said refuse in the storage container when the quantity of refuse in the hopper exceeds a threshold.

In some embodiments, the power management module is configured to evaluate electrical usage of the of the electrically actuated refuse loading assembly to estimate a weight of refuse loaded into the hopper and actuate the electrically actuated refuse packing assembly to remove the refuse from the hopper and to pack said refuse in the storage container when the weight of refuse loaded into the hopper exceeds the threshold.

In some embodiments, the electrically actuated refuse loading assembly includes an electrically actuated side loader including an electrically actuated side arm and an electrically actuated grabber; and the power management module is configured to evaluate the electrical usage of the electrically actuated side arm to estimate a weight of refuse loaded into the hopper.

In some embodiments, the power management module is configured to evaluate video camera images of the hopper or optical sensor data to estimate a volume or a height of refuse in the hopper and to actuate the electrically actuated refuse packing assembly to remove the refuse from the hopper and to pack said refuse in the storage container when the volume of refuse in the hopper exceeds the threshold.

In some embodiments, the refuse vehicle further includes a carry can coupled to an electrically actuated front loader, the carry can further include an electrically actuated arm and an electrically actuated grabber; and the power management module is configured to estimate a quantity of refuse in the carry can and to trigger the electrically actuated front loader to empty the carry can into the hopper when the quantity of refuse in the carry can exceeds a threshold.

In some embodiments, the power management module is configured to evaluate electrical usage of the of the electrically actuated arm to estimate a weight of refuse loaded into the carry can and actuate the electrically actuated front loader when the weight of refuse loaded into the carry can exceeds the threshold.

In some embodiments, the power management module is configured to evaluate video camera images of the refuse in the carry can or optical sensor data to estimate a volume of refuse in the carry can and actuate the electrically actuated front loader when the volume of refuse loaded into the carry can exceeds the threshold.

In some embodiments, the power management module is configured: process video data to estimate a load in a refuse container; and process said estimated container load to determine an actuation speed of the electrically actuated refuse loading assembly when lifting and emptying the refuse container.

In some embodiments, the power management module is configured to measure energy usage in each of the body systems during refuse collection operations.

In some embodiments, the power management module is configured to provide an aggregated report of said energy usage at predetermined time intervals.

In some embodiments, the power management module is configured for two-way electronic communication with a cloud-based computing system; and the power management module is configured to upload the electrical energy usage to a cloud database.

In some embodiments, the power management module is configured to receive vehicle efficiency recommendations from the cloud-based computing system.

In some embodiments, the power management module is configured to flag electrical energy usage that falls outside of corresponding energy usage threshold values or energy usage norms.

In some embodiments, the power management module is configured to evaluate said energy usage and provide vehicle maintenance recommendations, vehicle operator training recommendations, or vehicle route recommendations to reduce vehicle energy requirements.

In some embodiments, the power management module is configured to provide substantially real-time instructions to a vehicle operator, said instructions including recommendation to improve vehicle energy efficiency, said instructions provided via a driver interface.

In some embodiments, the power management module is configured to automatically block use of one or more of the electrically powered body systems when remaining battery life falls below a threshold.

In some embodiments, the vehicle body further includes at least one rechargeable battery system configured to provide electric power to the body systems.

In some embodiments, the refuse vehicle further includes charging rails deployed on a roof of the vehicle body.

In some embodiments, the refuse vehicle further includes at least one motion energy generator deployed on the vehicle body and configured to convert mechanical energy of uneven vehicle motion into electrical energy for charging a vehicle battery.

In some embodiments, the refuse vehicle further includes solar collection components deployed on the vehicle body and configured to convert solar energy into electrical energy for charging a vehicle battery.

In some embodiments, the refuse vehicle further includes wind collection components deployed on the vehicle body and configured to convert wind energy into electrical energy for charging a vehicle battery.

In some embodiments, the vehicle chassis is a fully-electric vehicle chassis.

Refuse vehicles are disclosed. In one embodiment a refuse vehicle includes a vehicle chassis and an all-electric vehicle body on the chassis. The chassis includes a chassis frame, a liquid natural gas or a compressed natural gas fuel storage tank, and a natural gas powered internal combustion engine. The vehicle body includes a refuse container and a plurality of electrically powered body systems. The body systems include an electrically actuated tailgate, an electrically actuated refuse loading assembly, and an electrically actuated refuse packing assembly. The vehicle body further includes a rechargeable battery pack configured to provide electric power to the body systems.

In another embodiment, a refuse vehicle includes a vehicle chassis and an all-electric vehicle body on the chassis. The body includes a hopper, a refuse storage container, and a plurality of electrically powered body systems. The body systems include an electrically actuated tailgate, an electrically actuated refuse loading assembly, and an electrically actuated refuse packing assembly configured to remove refuse from the hopper and to pack said refuse in the storage container. The vehicle (e.g., vehicle body) further includes a power management module configured to regulate energy usage of the body systems and/or to record and track electrical energy usage in the body systems. In certain embodiments, the vehicle may automatically regulate body system function to improve energy efficiency or provide recommendations to the vehicle operator to improve energy efficiency.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Disclosed refuse vehicle embodiments may include electrically actuated body systems, for example, including a including an electrically actuated tailgate, an electrically actuated refuse packing assembly configured to remove refuse from the hopper and to pack said refuse in the storage container, and an electrically actuated refuse loading assembly such as an electrically actuated front loader, rear loader, or side loader. The refuse vehicle may further include a power management module configured to regulate/reduce/optimize energy usage of various ones of the body systems. For example, in certain embodiments, the power management module may be configured to manage the energy usage of the refuse packing assembly or the refuse loading assembly.

Further embodiments provide a system and method (e.g., executed in full or in part by the power management module) for training a vehicle operator to improve energy efficiency during a refuse collection operation. Energy usage data is collected during the operation and compared/contrasted with energy usage norms and/or thresholds to evaluate driver performance. Recommendations may be generated based on the comparison and may he provided to the driver in real time (and at the beginning of a shift) to promote improved operational energy efficiency.

In an alternative embodiment the refuse vehicle includes a natural gas powered chassis including a natural gas engine and a compressed or liquid natural gas fuel storage container. The vehicle further includes an all-electric vehicle body including electrically actuated body systems, for example, including a including an electrically actuated tailgate, an electrically actuated refuse packing assembly configured to remove refuse from the hopper and to pack said refuse in the storage container, and an electrically actuated refuse loading assembly such as an electrically actuated front loader, rear loader, or side loader. In certain embodiments the all-electric vehicle body does not include any hydraulically actuated components.

Further refuse vehicle embodiments may include regenerative electrical power components such as road motion energy generators and regenerative braking to convert mechanical motion of the vehicle to electrical energy that may be used, for example, to recharge the battery(ies). Additional disclosed vehicle embodiments may include environmental energy capture components, such as solar or wind energy generators to convert environmental energy around the vehicle to electrical energy that may be used, for example, to recharge the battery(ies). Disclosed vehicle embodiments may further include charging rails (or other structures) to promote easy and efficient recharging (e.g., at a recharging station).

Figure 1:
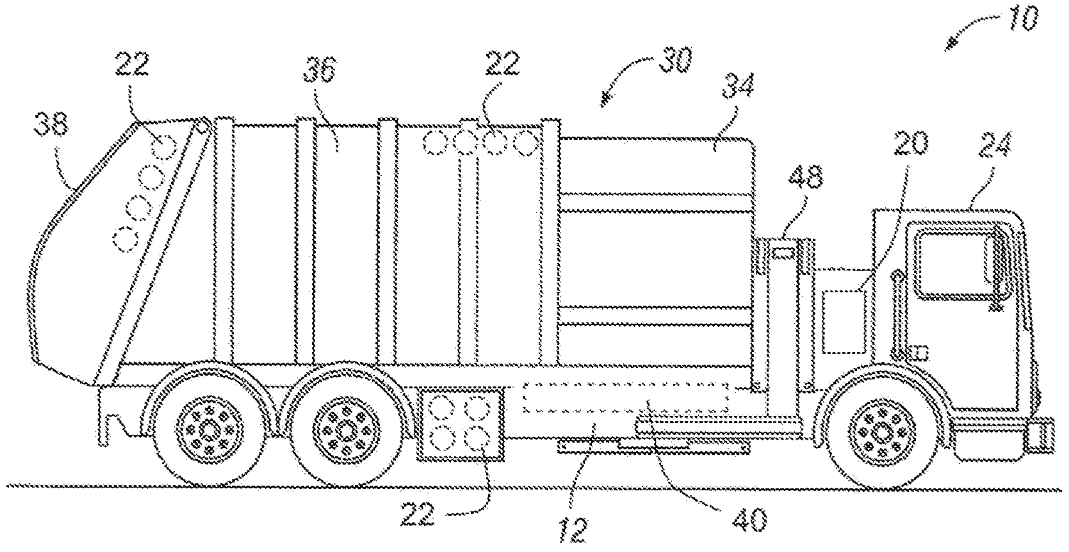
FIG. 1 depicts one example refuse vehicle including a natural gas powered internal combustion engine and an all-electric body.

FIG. 1 depicts one example refuse vehicle 10 in accordance with the disclosed embodiments. The depicted vehicle 10 includes an all-electric vehicle body 30 and a cab 24 deployed on a chassis (or frame) 12. This particular embodiment includes a liquid natural gas (LNG) or compressed natural gas (CNG) internal combustion engine (ICE) 20 configured to propel the vehicle 10. The vehicle body 30 may define a refuse container, which in the depicted embodiment includes a hopper 34 and a storage container 36 (with the hopper 34 located between the storage container 36 and the cab 24). A tailgate 38 is deployed on a rearward facing end of the body 30 and is configured to open and close the storage container 36 to the outside world. For example, the tailgate 38 may be pinned or hinged such that it rotates about a hinge between closed (as depicted) and open positions.

The vehicle body 30 further includes one or more LNG or CNG storage containers 22 that provide onboard fuel for the internal combustion engine. These storage containers 22 may be disposed in substantially any suitable location in the body 30 or on the chassis 12. The depicted embodiment shows three example locations (among many possible locations). For example, the storage containers 22 may be disposed in the tailgate as disclosed in commonly assigned U.S. Patent Publication 2017/0106746. The storage containers may alternatively be disposed in a roof compartment as disclosed in commonly assigned U.S. Patent Publication 2012/0280481. The storage containers may alternatively be deployed elsewhere, for example, along the chassis frame 12 as depicted.

With continued reference to FIG. 1, the vehicle body 30 is equipped with a number of electrically actuated body systems. The body systems may include, for example, an electrically actuated tailgate to open and close (and optionally lock) the tailgate 38, an electrically actuated refuse loading assembly (e.g., an electrically actuated front loader, side loader, or rear loader), and an electrically actuated refuse packing assembly configured transfer refuse from the hopper 34 and to compact the refuse in the storage container 36. The packing assembly may be further configured to eject refuse from the body 30 when the tailgate is open. Other systems requiring electrical power may include, for example, vehicle and work lighting and onboard vehicle computer and camera systems (e.g., as disclosed in commonly assigned U.S. Patent Publication 2020/0247609).

The vehicle body 30 may further include an electrical power source such as one or more rechargeable battery packs 40. The battery pack(s) may include substantially any suitable battery system, for example, including nickel batteries, lithium batteries, and the like and may be deployed substantially anywhere on the body 30. The battery pack(s) may be advantageously deployed on the underside of the body, for example, between adjacent frame rails 12, to lower the center of gravity of the vehicle 10. The disclosed embodiments are not limited in regard to the battery type or deployment in the body 30. Moreover, while not depicted, it will be understood that the ICE may further include an alternator electrically coupled with and configured to recharge the rechargeable battery pack 40.

It will be understood that the disclosed refuse vehicle embodiments are not limited to vehicles including a natural gas powered ICE and an all-electric body. The disclosed embodiments may also include an all-electric vehicle including an electrically powered propulsion system (an electric motor) and electrically actuated body systems. In such embodiments the propulsion system and the body systems may receive power from the same electrical power source (e.g., located on the chassis) or from dedicated power sources (e.g., a first power source on the chassis and a second power source in the body). The disclosed embodiments are expressly not limited in this regard.

It will be understood that the disclosed embodiments are not limited to any particular type or style of refuse vehicle. The vehicle may include a sanitation truck, a recycling truck, a garbage truck, a waste collection truck, etc. In FIG. 1, the depicted vehicle 10 is configured as a side loading refuse vehicle; including an electrically actuated side loader assembly configured to load refuse into the hopper 34 from alongside the vehicle. The disclosed embodiments are, of course, not limited in regard to any refuse loading configuration. For example, while not depicted on FIG. 1, the vehicle may also be configured as a front loading refuse vehicle including a front loading assembly configured to load refuse from the front of the vehicle. The vehicle may also be configured as a rear loading refuse vehicle, for example, configured for automatic or manual loading of refuse at the rear of the vehicle. Those of ordinary skill will readily appreciate that tailgates in front and side loading vehicles may be similarly constructed, while the tailgate in a rear loading vehicle is generally heavier and includes a built in hopper and compaction unit.

It will further be understood that the particular electrically actuated body systems employed by a refuse vehicle may depend on the type and configuration of the refuse vehicle. For example, the vehicle 10 depicted on FIG. 1 includes a side loader 48 and may include an electrically actuated grabber (for grabbing a refuse container) and an electrically actuated side loader arm (configured to move the grabber in and out from the body and up and down).

Figure 2A:
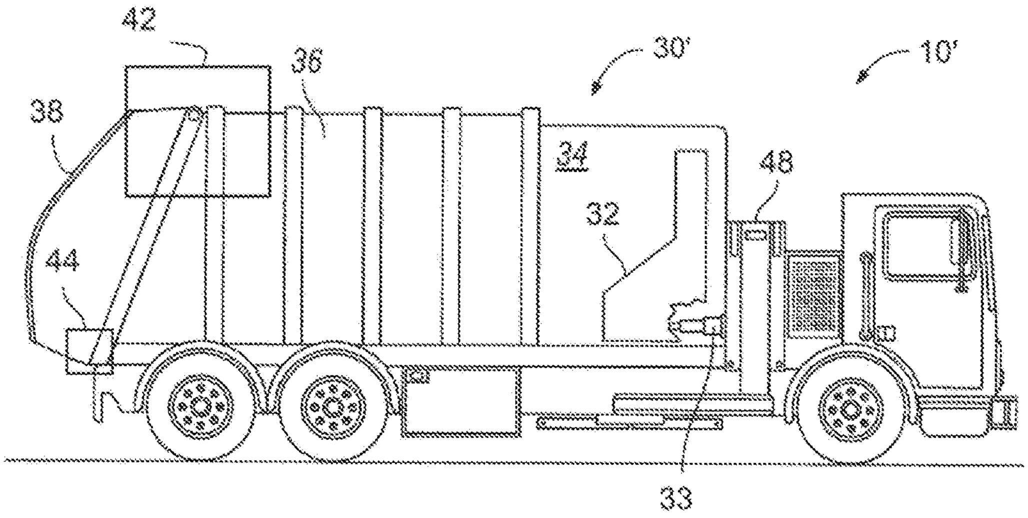
FIGS. 2A, 2B, and 2C (collectively FIG. 2) depict example refuse vehicles including electrically actuated body systems.
Figure 2B:
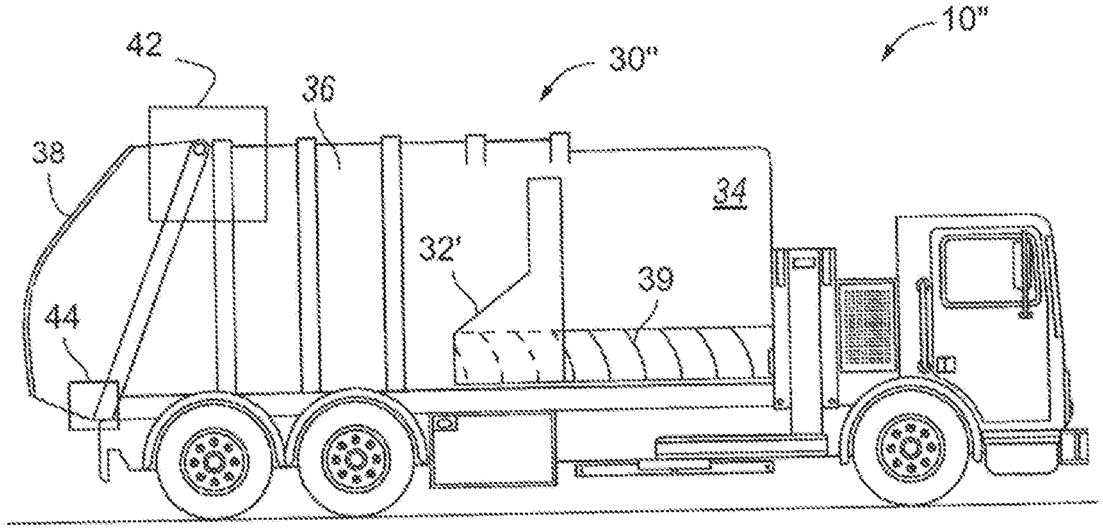
Figure 2C:
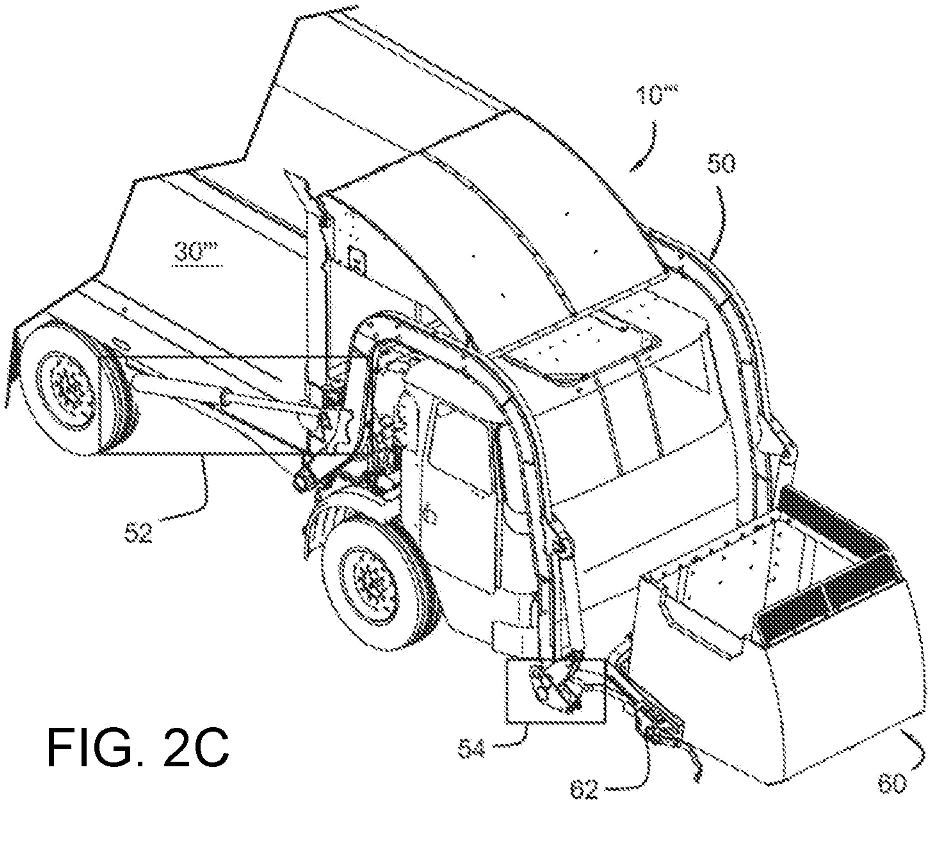

Various electrically actuated body systems are depicted on FIGS. 2A, 2B, and 2C in refuse vehicles 10', 10'', and 10'''. As depicted on FIG. 2A, all-electric vehicle body 30' may include an electrically actuated tailgate open/close system 42 and an electrically actuated tailgate locking mechanism 44. While not depicted in FIG. 2A, the tailgate open/close system 42 and the tailgate locking mechanism 44 may be integrated into a single system that both closes and locks the tailgate or unlocks and opens the tailgate. Vehicle 10' further includes a side loader assembly 48 configured to load refuse into the hopper. The side loader may include substantially any suitable electrically actuated grabber mechanism (for grabbing a refuse container) and an electrically actuated side loader arm (configured to move the grabber in and out and up and down with respect to the body 30').

FIG. 2A further depicts an ejector 32 (also referred to in the industry as an ejector panel, a packer, and a packer panel among other terms) deployed in the body 30'. The ejector 32 is configured to translate between forward (retracted) and rearward (extended) positions in a direction substantially parallel with an axis of the vehicle 10'. The vehicle 10' further includes an electric ejector actuator 33 configured to translate the ejector 32 between the retracted and extended positions. The vehicle may include substantially any suitable ejector actuator 33, for example, including electric motor powering a rack and pinion configuration in which the ejector panel is coupled to the rack or an electric motor powering a lead screw or ball screw. The disclosed embodiments are not limited in these regards.

It will be appreciated that the ejector 32 is generally retracted towards the front of the vehicle 10' when collecting refuse into the hopper 34, for example, via a side loader assembly 48 or a front loader assembly. For example, in the embodiment depicted on FIG. 2A, the ejector may be retracted to the front of the hopper 34 (adjacent to the cab). When the hopper 34 is full (or at any other suitable time determined by the operator and as described in more detail below), the ejector 32 may be electrically actuated toward the rear of the vehicle 10' to empty the hopper 34 and compact the refuse in the storage container 36.

In the vehicle embodiment 10'' depicted on FIG. 2B, the ejector 32' may be retracted to the front side of the storage container 36 (between the storage container 36 and the hopper 34). In such embodiments, the hopper 34 may include an auger 39 configured to transfer refuse from the hopper 34 to the storage container 36. The auger 39 may extend rearward through an opening in the ejector 32'. Rotation of the auger 39 (e.g., via an electric motor) is intended to empty the hopper 34 as well as compact (or partially compact) refuse in the storage container 36. From time to time the ejector 32' may optionally be extended toward the rear of the body 30'' to further compact the refuse in the storage container 36. As described in more detail below, the auger 39 may be continually rotated or only rotated when the hopper is sufficiently full to warrant refuse compaction.

Turning now to FIG. 2C, an example front loading vehicle embodiment 10''' is depicted including vehicle body 30'''. Vehicle 10''' includes a front loading assembly 50 configured to load refuse into the vehicle body 30'' (e.g., up and over the cab in the depicted embodiment). A front loading assembly 50 may include electrically actuated loader arms supporting a plurality of forks that are sized and shaped to engage a dumpster or a carry can 60. The loader arms may be actuated using substantially any suitable electric actuators 52, for example including linear actuators. The forks may also be electrically actuated 54, for example, via an electric motor, to rotate the forks up and down about a pivot (not depicted).

With continued reference to FIG. 2C, a carry can 60 is shown deployed on the front loader assembly 50. The carry can may include a side loader assembly 62 similar to the side loader assembly 48 described above. Side loader assembly 62 may be configured to load refuse into the carry can 60 and may include substantially any suitable electrically actuated grabber mechanism (for grabbing a refuse container) and an electrically actuated arm (configured to move the grabber in and out and up and down with respect to the can 60).

Figure 3:
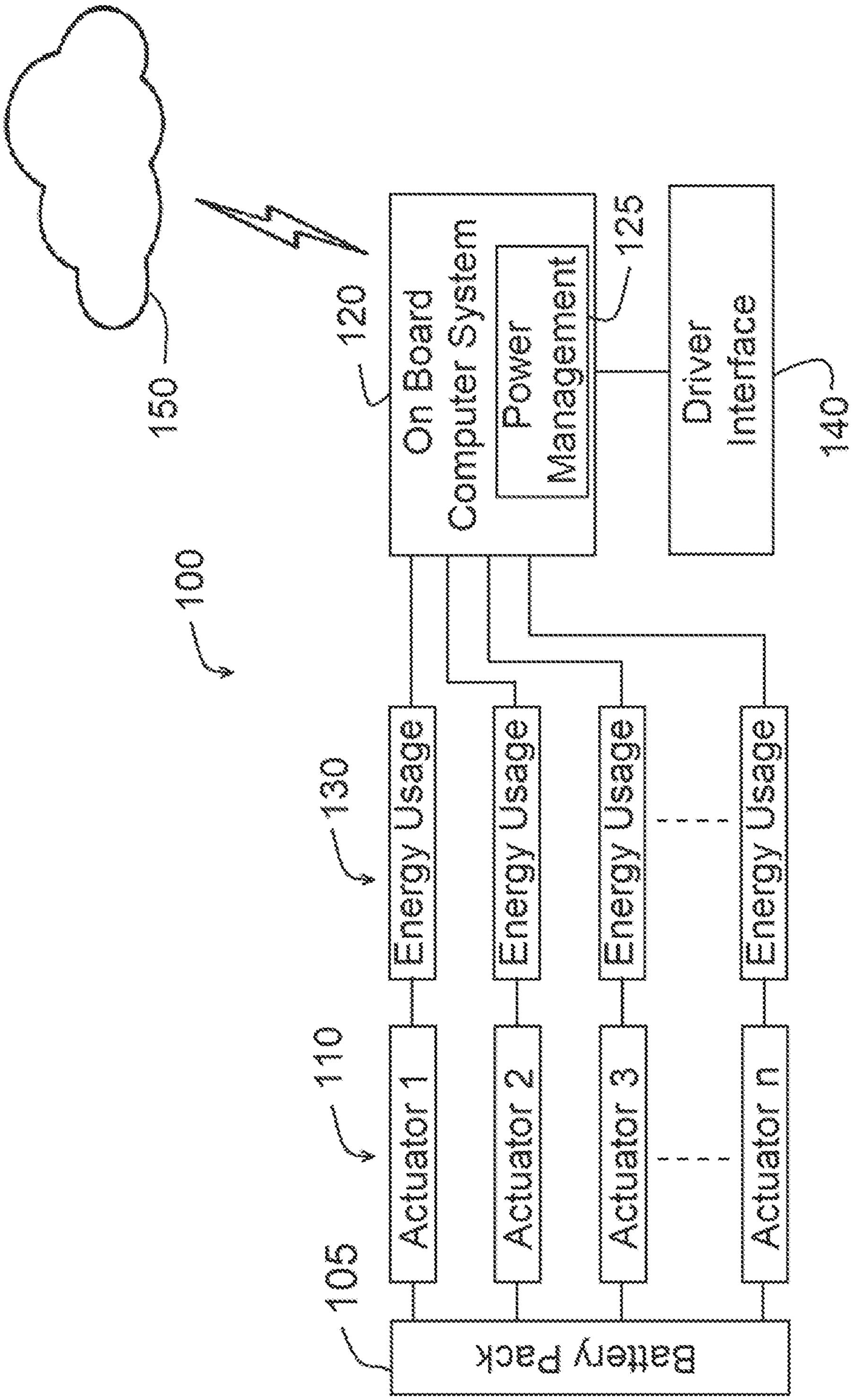
FIG. 3 depicts a schematic block diagram of an example power system 100 for a refuse vehicle.

FIG. 3 depicts a schematic block diagram of an example power system 100 for a refuse vehicle. The power system 100 may be utilized in (or incorporated into) substantially any electrically powered refuse vehicle or all-electric vehicle body, for example including the vehicle embodiments depicted in FIGS. 1, 2A, 2B, and 2C. Power system 100 includes a plurality of electric actuators 110 (i.e., actuator 1, actuator 2, actuator 3, and so on) deployed throughout the vehicle body and configured to electrically actuate the various body systems described above (e.g., the electrically actuated tailgate, the electrically actuated refuse packing assembly, and the electrically actuated refuse loading assembly embodiments described above). The actuators 110 are electrically coupled to a battery pack 115 from which they receive electrical power. As described above, substantially any suitable battery pack may be employed. For example, battery pack 115 may include the battery pack 40 shown on FIG. 1.

The actuators 110 are in two-way electronic communication with an onboard computer system 120 that includes a power management module 125. The power management module 125 is configured to receive, record, and process energy usage data 130 from one or more (e.g., from each of) the actuators 110 during a refuse collection operation. As described in more detail below, the data 130 may be processed, for example, in real time during a refuse collection operation to automatically regulate the energy usage of the vehicle (e.g., to improve energy efficiency) and/or to provide feedback/coaching to the driver via the driver interface 140. Automatic improvement may be realized, for example, via controlling actuator speed or the actuation period of the various body systems based on the energy usage measurements. Driver efficiency may also be improved, for example, by providing real time instructions/coaching to promote improve vehicle operation.

By real time it is meant that energy data collected during a collection operation (a route) may be processed to provide automatic control or driver instructions during the same operation (the same route). The timeliness may depend, for example, on the quantity of data collected, the complexity of the processing, and whether or not cloud processing is implemented. In certain advantageous examples, real time may mean within 10 minutes, 30 minutes, 1 hour, or two hours.

Note that the term module as used herein in referring to the power management module may simply refer to a computer software routine configured to perform a particular task or particular tasks (e.g., related to vehicle power management). The routine may run, for example, on the onboard computer. The module may likewise refer to a platform including a combination of dedicated hardware and software configured to perform various tasks (e.g., the vehicle power management tasks in the disclosed embodiments). Such hardware may include one or more processors and dedicated memory and may be in communication with or incorporated into the onboard computer.

With continued reference to FIG. 3, the vehicle computer system 120 may be in two-way communication (e.g., via a cellular carrier) with other internet based computing systems (the cloud) 150. For example, the energy usage data 130 may be uploaded to the cloud 150 (e.g., to an online database) where it may be made available for further processing and evaluation. In one embodiment, the energy usage data 130 may be compared with fleet-wide energy usage data and further processed. Instructions for further efficiency improvements may be transmitted back to the computer system 120 where they may again be used to automatically improve the energy efficiency of the vehicle and/or to provide feedback to the driver via interface 140.

Figure 4A:
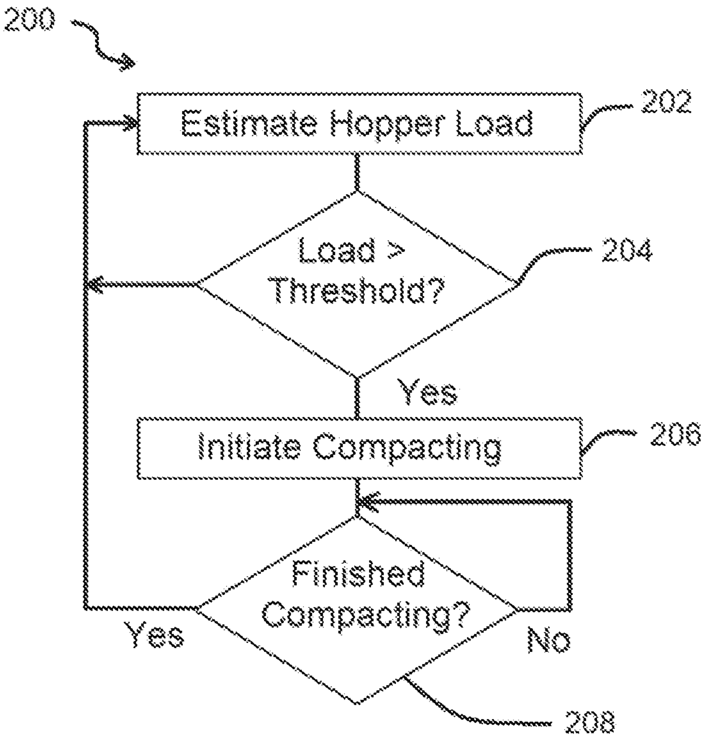
FIGS. 4A, 4B, and 4C (collectively FIG. 4) depict flow charts of example methods for estimating hopper load and triggering the initiation of refuse compaction to conserve energy.
Figure 4B:
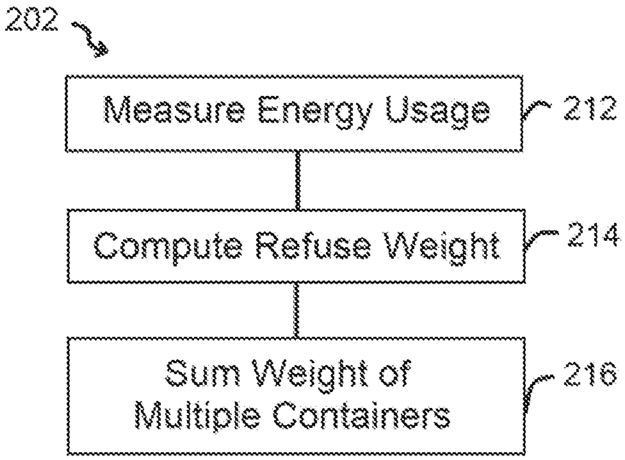
Figure 4C:
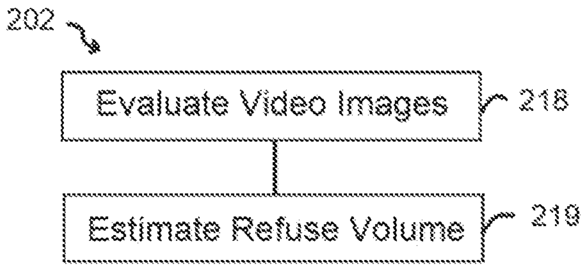

FIGS. 4A, 4B, and 4C (collectively FIG. 4) depict flow charts of example methods by which the power management module 125 (FIG. 3) may regulate energy usage of the body systems. In this particular example, a method is provided for regulating energy usage of the refuse packing assembly (e.g., the packer panel and/or the auger described above), although the disclosed embodiments are not limited in this regard. The hopper load (or fullness) is estimated at 202 and compared with a threshold at 204. If the hopper load is less than the threshold, the method returns to 202 and again estimates the hopper load at some future time. If the hopper load exceeds (or is equal to) the threshold, instructions are transmitted to the refuse packing assembly to begin a refuse compaction routine at 206. After some time, the method evaluates whether the compaction routine is completed at 208 before returning to 202. The method may wait until compaction is completed prior to returning to 202.

With continued reference to FIG. 4A, the power management module may be further configured to optimize refuse packing by monitoring actuator power usage. For example, actuator power may be regulated to prevent over or under packing and thereby optimize packing and vehicle efficiency.

FIG. 4B depicts one method for estimating the hopper load at 202. For example, the power management module 125 (FIG. 3) may evaluate the energy usage, such as the current draw, in a side loader assembly at 212 and compute the weight of the refuse dumped into the hopper at 214. The weight may be compared with a threshold in 204. The refuse loading assembly may continue to load refuse into the hopper until the weight exceeds the threshold with the weights of multiple (successive) loaded refuse containers being summed at 216 to compute the total refuse weight in the hopper.

FIG. 4C depicts another method for estimating the hopper load at 202. For example, the power management module may evaluate video images of the hopper (or optical sensor data) at 218 to estimate a volume (or a quantity) of refuse in the hopper at 219. For example, the video data may be evaluated using artificial intelligence routines or video processing routines to estimate the volume or a height of refuse in the hopper. This volume or height may then be compared with a corresponding threshold in 204 (FIG. 4A). The refuse loading assembly may continue to load refuse into the hopper until the volume or height of the refuse exceeds the threshold (at which time the compaction routine is initiated at 206).

With continued reference to FIG. 4A, initiating the compaction routine at 206 may include applying electrical power to an auger to rotate the auger. Auger energy usage (e.g., current draw) may be evaluated at 208 to determine when the hopper is suitable empty (and the compaction routine has finished). For example, the auger current may fall below a threshold when the hopper is empty (or nearly empty). Video data may also be evaluated to determine when the hopper is empty.

Initiating the compaction routine at 206 may alternatively (or additionally) include actuating an ejector to translate through the hopper towards the rear of the vehicle (to empty the auger). The position of the ejector (e.g., evaluating whether the ejector has returned to the front of the hopper) may be evaluated at 208 to determine when the compaction routine as finished. Video data may also be evaluated to determine when the ejector has returned to its home position.

With continued reference to FIG. 4, method 200 may also be implemented on a front loading refuse vehicle including a carry can (a modular container) deployed on the front loading assembly. The fullness of the carry can may be evaluated, for example, as described above via processing electrical usage of the side loading assembly mounted on the carry can or via video or optical data.

With continued reference to FIG. 4, the above described weight data may be uploaded to the cloud and used to compute household weight averages or totals per unit time (e.g., per month, quarter, or year). The data may then be further processed to compute power per stop or a power requirement per household. Such data may be further processed to estimate the power requirements necessary to finish a route and for evaluating whether or not to implement various power saver modes of operation with the understanding that at the end of a route, enough residual power is required to open the tailgate and eject the load at the landfill (or incinerator, etc.). Household weight averages (or totals) may further be utilized to incentivise customers to improve conservation or recycling efforts.

Figure 5:
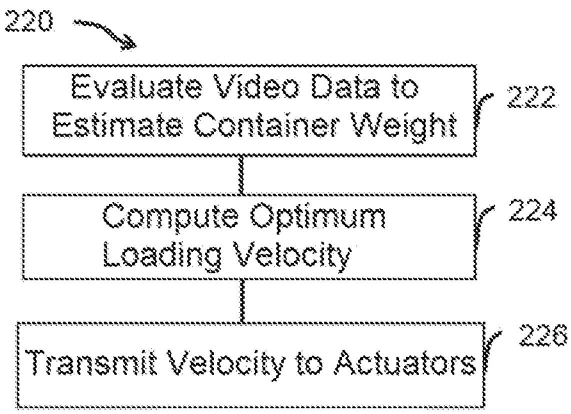
FIG. 5 depicts a flow chart of an example method for controlling the speed of an electrically actuated refuse loading assembly to balance energy and time constraints.

FIG. 5 depicts an alternative method 220 by which the power management module may regulate energy usage of the body systems. At 222, the module process video data (or other data) to determine the fullness of a container needing emptying (i.e., containing refuse to be loaded into the vehicle). The container may include a dumpster to be emptied using a front loader or a rear loader or a refuse can to be emptied using a side loader. The data (e.g., video data) may be processed at 222 to estimate a weight of the container (e.g., based on the type of refuse in the container and the structural configuration of the container itself). The module may then compute an optimum loading speed (velocity) at 224 (to reduce the energy requirements for emptying the container) and then transmit the speed to the loading assembly actuators at 226. For example, for more heavily loaded containers, it may be more energy efficient (and therefore advantageous) to reduce the actuator speedy and acceleration. Lighter containers may be emptied more quickly to save time. The power management module 125 (FIG. 3) may be configured to balance energy saving demands and loading time demands. This balance may be adjustable (even during a route), for example, depending on the remaining battery life. As the battery life decreases it may be advantageous to adjust the balance towards improving energy efficiency at the expense of increased loading time, for example, via implementing a power saver mode.

A suitable power saver mode may be further configured, for example, to monitor remaining battery capacity and restrict certain body functions when the remaining capacity falls below a threshold (e.g., to conserve battery life and prevent the vehicle from becoming stranded or otherwise inoperable during routine operations). The threshold may be determined adaptively, for example, updated or recalculated from time to time throughout the day based on current GPS location, the number and location of stops/picks remaining on the route, average power usage per stop/pick, average power required to eject the load, current vehicle weight, etc. Moreover, the threshold may optionally include a plurality of thresholds, with the response to battery capacity falling below each successive threshold becoming more severe.

For example, the driver may merely be alerted when battery capacity falls below a first threshold. Coaching may be provided to assist the driver in reducing energy usage and implementing energy saving measures.

Use of one or more of the electrically powered body systems may be restricted or limited when battery capacity falls below a threshold (such as a second and/or subsequent threshold). For example, the module may restrict or block use of the electrically actuated loading assembly (such as a side loader or front loader assembly) so that the vehicle is no longer able to take on additional loads when the battery capacity falls below the threshold. For example, when the battery capacity falls below the second threshold, a side loader or front loader assembly may be returned to the home/travel position and the driver alerted that no further picks will be allowed. The second threshold value may be selected such that sufficient battery capacity remains to eject the load at a landfill (or other location) and return the vehicle to a recharging station.

Use of the electrically powered body systems may be fully blocked (with the exception of safety related functions), when battery capacity falls below a threshold (e.g., a third threshold). In such cases the driver may be instructed to return directly to a recharging station. For example, the module may block the body from taking on additional refuse, further packing the refuse in the body, or even ejecting the load. The third threshold value may be selected such that sufficient battery capacity remains to return the vehicle to a recharging station without becoming stranded (or damaging the vehicle battery or battery systems).

The power management module may be further configured to predict if/when battery capacity is expected to fall below the above described threshold or thresholds based on historical and current power usage, environmental conditions, various details of the route, etc. The module may further alert the driver if/when battery capacity is expected to fall below one or more of the thresholds. In this way the driver may be made aware that there is a need to implement energy conservation measures or that the route may need to be altered. The module may further relay this information (regarding the thresholds) to a central location, for example, as described above with respect to FIG. 3.

In evaluating power usage, the power management module may determine that the battery system has excess capacity (e.g., more than required to finish the route). In such instances, the module may communicate with the central location, thereby making the vehicle available for a certain number of additional loads/picks. In this way a vehicle with excess battery capacity may be made available to assist another vehicle that is unable to finish a route (e.g., due to limited battery capacity as described above).

The power management module may be configured to evaluate energy usage, for example, via a software partition. For example, in a refuse vehicle including a single chassis battery pack, the module may "partition" available electrical energy into (i) chassis motive power and (ii) body function requirements. The module may be configured to monitor actual energy usage and predict future energy usage for each partition based on various route details and vehicle norms. Moreover, the size of each software partition may be route and vehicle specific. For example, a high density pick route (which is optimal for chassis regenerative braking) may enable more energy to be made available for body functions.

It will be understood that the power management module may further sub "partition" the available energy. For example, the body partition may be further divided into loading/picking, packing, and ejecting sub partitions.

Figure 6:
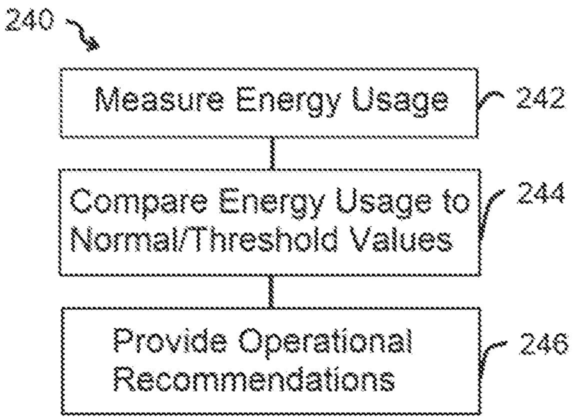
FIG. 6 depicts a flow chart of an example method that may be executed by the power management module to evaluate vehicle efficiency and to make corresponding operational recommendations.

FIG. 6 depicts a flow chart of an example method 240 for evaluating vehicle efficiency and making corresponding operational recommendations. The energy usage of the various body systems are measured and received by the power management module 125 (FIG. 3) at 242 (as described above). The energy usage (e.g., of each actuator) may be compared with normal usages and/or threshold values at 244. The comparison may take place in the power management module or in the cloud (e.g., as depicted in FIG. 3). The normal usage values may be for the particular vehicle and route or fleet wide usages (either locally or on a wider geographical scale). Based on the comparison in 244, the power management module may provide operational recommendations/coaching at 246. The operational recommendations may be provided, for example, to the driver (via the driver interface) or to a more centralized location via the cloud.

In certain embodiments the power management module may provide an aggregated report on the energy usage per actuator and/or per body system to the driver and/or the cloud at predetermined time intervals (or when a particular condition is noted by the comparison). For example, the module may report to the driver and/or the cloud when energy usage in one or more of the actuators or body systems falls outside of corresponding energy usage threshold values (or averages). Such "flagged" usages may be used, for example, to provide maintenance recommendations to headquarters (or a maintenance department). With regard to maintenance, it will be appreciated that a failing actuator (or components in need of lubrication) may cause excess energy usage that can be flagged by the power management module.

The power management module may further be configured to continually compute rolling averages of energy usage per component actuation (e.g., energy per pick or load for a side or front loader assembly or energy per packing cycle). The module may be configured to alert the driver and/or communicate with the cloud should such energy usage fall outside certain norms. For example, the driver (or a maintenance department) may be alerted when the rolling average increases (e.g., by a certain percentage or above a threshold). The module may be further configured to evaluate certain system data (e.g., temperature, altitude, video data, etc.) to determine a likely cause for the increased power usage. In such embodiments, the module may be configured to select a likely cause for the increased energy usage (e.g., environmental reasons, a failing actuator, or battery degradation).

The results of the comparison may also be communicated to the driver (via the driver interface), for example, to provide coaching (or instruction) for improving energy efficient operation of the vehicle. For example, if the actuator responsible for moving a side loader in and out from the body is observed to have excessive energy usage, the driver may be prompted to position the vehicle closer to the container. The energy usage data may further be combined, for example, with video data to provide a more accurate assessment of vehicle operation and to therefore provide better coaching/instruction. In the above example, the video data may be used confirm the recommendation to position the vehicle closer to the container.

Figure 7:
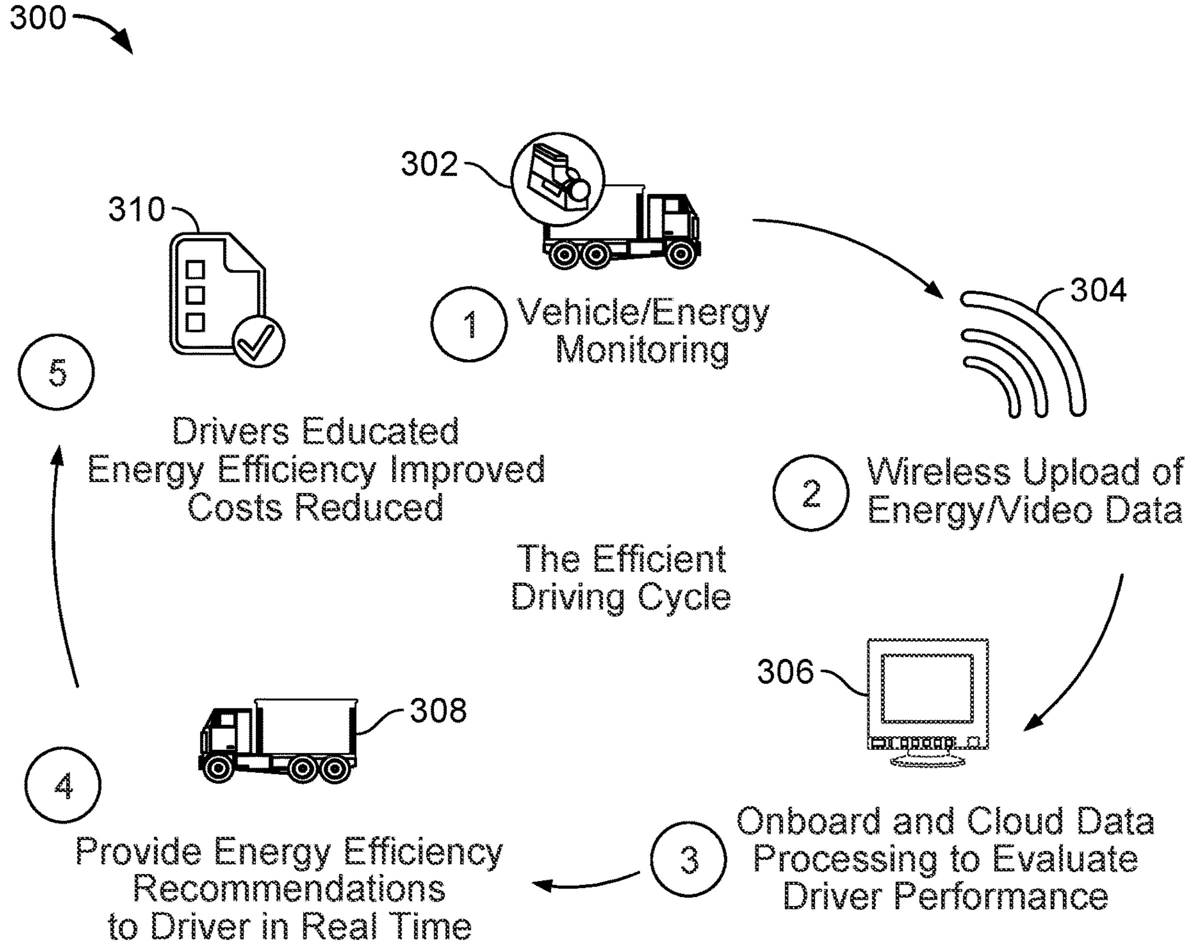
FIG. 7 depicts an example block diagram illustrating an efficient driving cycle in which drivers may be trained to improved energy efficiency of refuse vehicle operations.

FIG. 7 depicts an example block diagram illustrating a vehicle information energy efficiency cycle 300 for improving driver efficiency. Vehicle energy usage and other analytics (e.g., including video analytics, driving activity, and body systems monitoring) are collected and stored to memory at 302 (e.g., using the system depicted on FIG. 3). The data collected at 302 may be uploaded to the cloud at 304 at periodic intervals (e.g., every 10 minutes, every hour, and/or every shift or whenever a predetermined quantity of data has been generated). The data may be processed on-board and in the cloud, for example, via comparing vehicle energy usage with various energy usage norms and thresholds to evaluate driver performance at 306. These norms and thresholds may be determined based on fleet-wide vehicle performance, various refuse vehicle operational standards, as well as known battery capacity and details of the route. For example, drive performance may be evaluated to determine Whether or not operational changes may be implemented to improve energy efficiency of the operation (e.g., pulling closer to a container prior to emptying the container, executing more or less compaction cycles, the efficiency and use of regenerative mechanisms, etc.). Recommendations may be provided to the driver in real time and at the beginning (or end) of a shift for improving energy efficiency at 308. The recommendations may be provided, for example, via alerts or other guidance using the driver interface. In this way the drier may be trained to operate the vehicle in a more energy efficient manner at 310 and thereby potentially improve vehicle range and reduce operational expenses.

Figure 8A:
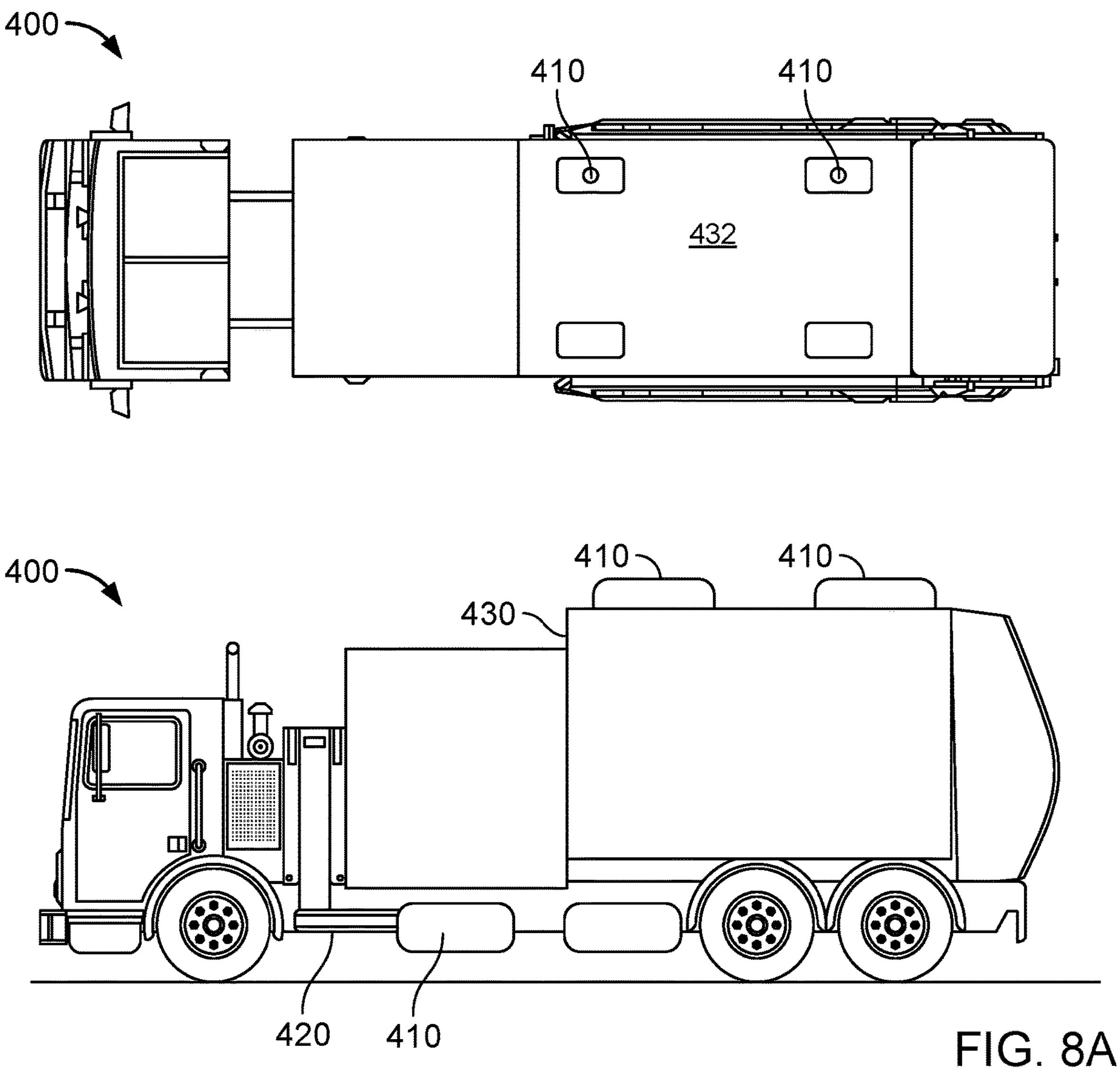
FIGS. 8A and 8B depict a refuse vehicle including a plurality of road motion energy generators with FIG. 8B depicting a cross section of one of the energy generators.

FIG. 8A depicts another refuse vehicle embodiment 400 including a plurality of road motion energy generators 410 deployed on the vehicle body 430 and/or the chassis 420. The road motion energy generators are configured to convert the mechanical energy of uneven vehicle motion (e.g., rocking and swaying of the body) into electrical energy that may be used to charge the vehicle battery(ies) or a secondary/emergency battery. In the depicted embodiment, the energy generators are deployed on the roof 432 and along the frame 420 (although the disclosed embodiments are not limited in this regard).

Figure 8B:
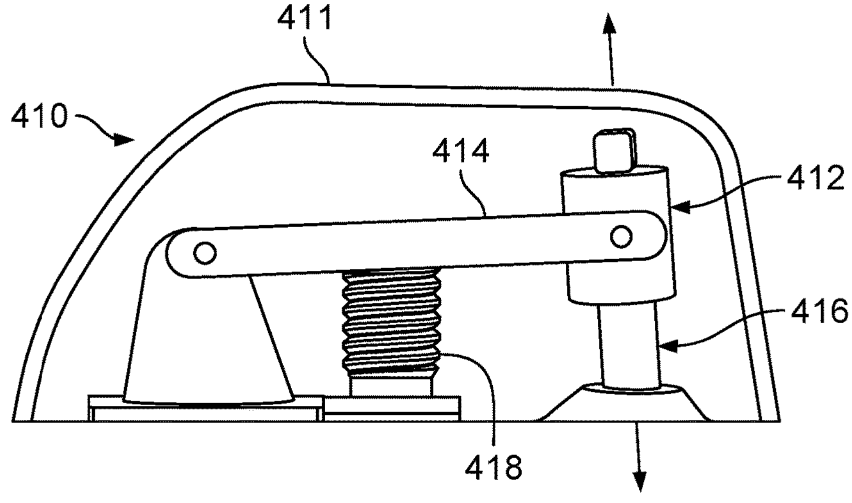

FIG. 8B depicts a cross section of one of the road motion energy generators 410. As depicted, the unit is deployed in a housing 411 and includes a magnetic coil 412 disposed on one end of a pivoting lever arm 414 and about a conductive post (e.g., a copper rod) 416. Motion of the vehicle (e.g., the above described road motion) causes the lever arm to move (bounce) up and down against spring 418. Motion of the coil along the length of the post generates electrical energy, which may be provided to a chassis or body battery pack for recharging. The vehicle may of course further include regenerative braking and other known systems for recharging the battery pack(s). For example, systems used in other industries for battery recharging include solar energy collection and wind energy collection, and these could be specially configured for use on an RCV due to the unique characteristics of an RCV which provide opportunities for better solar and wind collection that are not afforded by the shapes or functions of other types of vehicles (e.g., such as passenger, commercial, or utility vehicles). A possible solar energy collection embodiment on an RCV may include photovoltaic cells (or other photon collecting means) arranged onto a vehicle 10 so that solar energy is collected during operation of the vehicle (or during times the vehicle is not being operated, e.g. during times when the vehicle is parked or idling or entirely off-duty such as in between work hours). A possible wind energy collection embodiment on an RCV may convert wind energy (relative motion between a vehicle and the air surrounding it while it is in motion) via devices (e.g., small wind turbines or other means) which do not create substantial additional drag on the vehicle but instead take advantage of the large frontal surface area of the RCV to create electricity rather than simply exert drag forces during forward motion of the vehicle. Embodiments of wind energy collection may also assist in air cooling of battery systems mounted onto the vehicle 10.

Figure 9A:
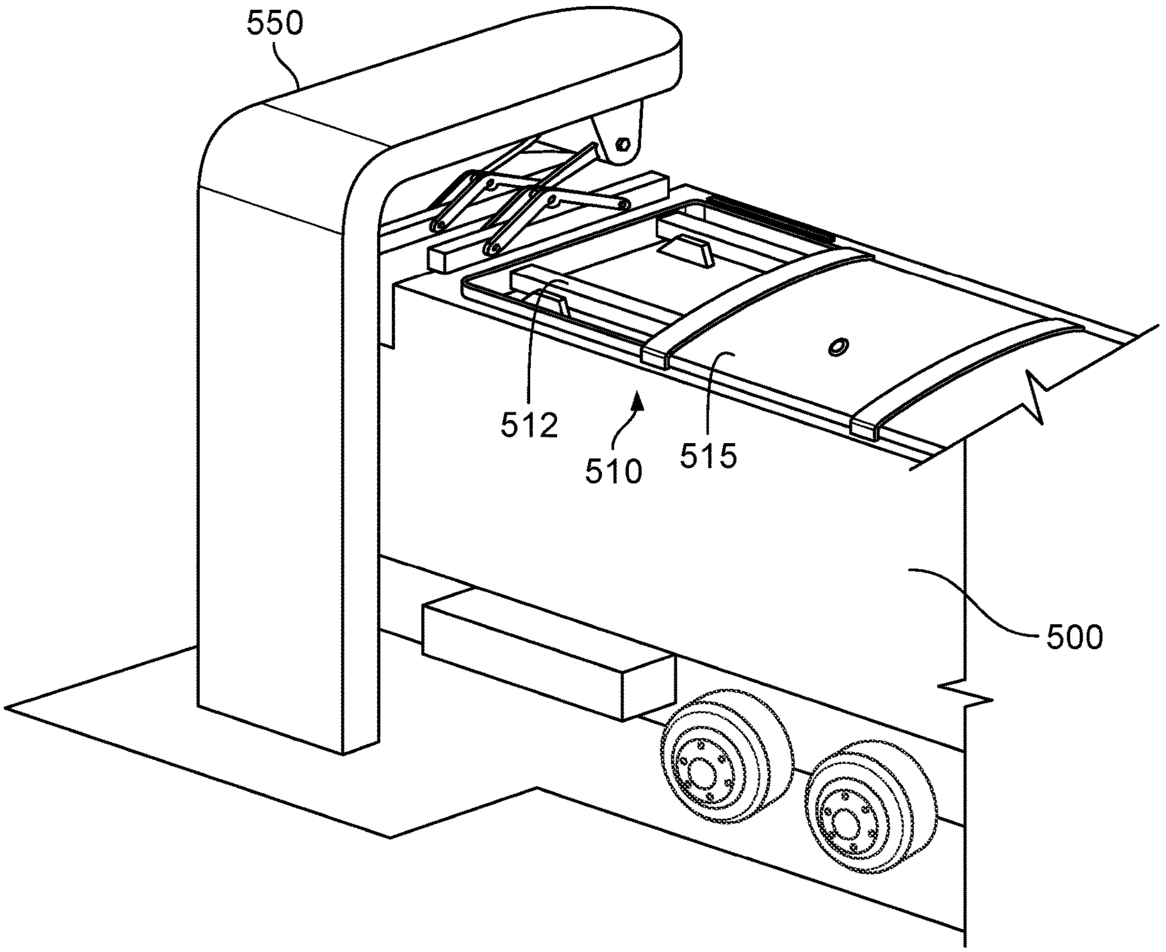
FIGS. 9A and 9B depict body integrated (9A) and roof mounted (9B) charging rail systems that provide for quick and easy recharging of an electric refuse vehicle.
Figure 9B:
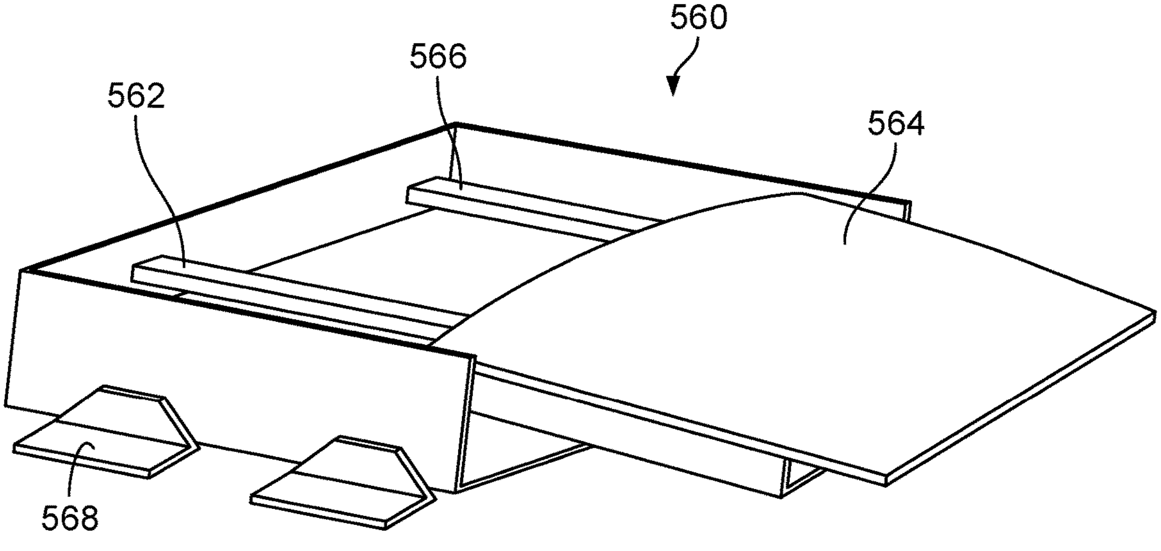

FIGS. 9A and 9B depict body integrated and roof mounted charging rail systems that provide for quick and easy recharging of an electric refuse vehicle (e.g., of a body battery, a chassis battery, or an integrated battery system). In FIG. 9A, a refuse vehicle 500 is parked in a recharging station 550. The vehicle 500 includes an integrated charging rail system 510 including a plurality of electrically conductive charging rails 512 recessed in the roof of the vehicle body. The charging rails may be electrically coupled to a battery pack such that application of electrical energy (e.g., via the station 550) to the rails recharges the battery(ies). A sliding (optionally sealed) access panel 515 may protect the rails 512 during normal vehicle usage and provide access to the rails during recharging.

FIG. 9B depicts a modular roof mounted charging system 560 configured for mounting on the roof of the refuse vehicle. The roof mounted system 560 is similar to the integrated system in that it includes a plurality of rails 562 configured to receive electrical energy to recharge the battery(ies) and a sliding access panel (door) 564. The rails may be located in a housing 566 configured for mounting to the roof of the vehicle (e.g., via bolts or a weld at 568).

Some embodiments of electric body and electric chassis integration may require improvements to avoid a vehicle owner from having to provide two charging sources, especially if there is a dedicated and/or somewhat separate battery system for each chassis and body power requirements. For example, if the chassis battery voltage is significantly higher than the body battery voltage requirements, it may be advantageous to provide separate charging stations for each body and chassis battery. However, this may be inconvenient for the end user (owner or operator of the RCV), for example when managing a large fleet of vehicles. In some embodiments, a charging management system to improve end user experience of charging the RCV may include a single integrated charging interface, which may modulate charging voltage depending on which battery needs to be charged. An integrated charging management system may also enable prioritization of battery charging. In some embodiments, a charging management system may provide a single integrated charging port, but prioritize fully charging the chassis battery prior to fully charging the body battery. In other embodiments, it may be more convenient for the end user to have prioritization of a battery charge level to be set based on intelligent prediction of use (e.g., if the intelligent charging system knows which route and driver is planned next, and also power use tendencies for that route, information about the type of refuse collected on the next planned route (such as recycle versus organic, or other type of refuse), information about the onboard batteries' health, information about the driver's behaviour trends, environmental data such as weather which may impact battery discharge throughout the next planned route, and other such information), and therefore if the route planned for the next RCV uptime may have more body battery use than chassis battery use, the charging system could prioritize charging of the body battery first. The charging system could also alert an operator when enough charge of the vehicle's batteries has reached enough charge level to complete the next planned route, allowing the operator to begin their route without waiting for a full charge cycle. In such embodiments, it could be helpful to build in a factor of safety (e.g., range or route completion over-estimate of power level required) and even allow drivers to customize alerts based on their preferred factor of safety.

Although power management in an electric refuse vehicle has been described in detail, it should be understood that various changes, substitutions and alternations can be made herein without departing from the spirit and scope of the disclosure as defined by the appended claims.

The invention claimed is:

1. A refuse vehicle comprising:
- a vehicle chassis, the chassis including a chassis frame;
- an electric vehicle body on the chassis, the body including:
  - a refuse storage container;
  - a hopper;
  - electrically powered body systems, the body systems comprising:
    - an electrically actuated refuse loading assembly configured to load refuse into the hopper; and
    - an electrically actuated refuse packing assembly configured to transfer refuse from the hopper into the refuse storage container;
  - a plurality of electric actuators configured to electrically actuate the electrically powered body systems; and
  - at least one rechargeable battery pack configured to provide electric power to the body systems; and
- at least one processor in electronic communication with the plurality of electric actuators and configured to perform operations comprising:
  - determining, based at least in part on aggregated energy usage data received from a first electric actuator of the plurality of electric actuators, an aggregated amount of electrical energy drawn from the at least one rechargeable battery pack by the electrically actuated refuse loading assembly, the first electric actuator configured to electrically actuate the electrically actuated refuse loading assembly, the aggregated energy usage data comprising energy usage data that is aggregated, by the at least one processor, over multiple cycles of the electrically actuated refuse loading assembly;
  - estimating an amount of refuse contained within the hopper of the vehicle body based at least in part on: (i) operation of the electrically actuated refuse packing assembly, and (ii) the aggregated amount of electrical energy drawn from the at least one rechargeable battery pack by the electrically actuated refuse loading assembly; and
  - in response to determining that the amount of refuse contained within the hopper of the vehicle body exceeds a threshold, causing electrical energy to be supplied from the at least one rechargeable battery pack to a second electric actuator of the plurality of electric actuators, the second electric actuator configured to electrically actuate the electrically actuated refuse packing assembly.

2. The refuse vehicle of claim 1, wherein the at least one battery pack is deployed on an underside of the vehicle body between adjacent rails in the chassis frame.

3. The refuse vehicle of claim 1, wherein the chassis comprises an internal combustion engine, the internal combustion engine comprising an alternator electrically connected with and configured to recharge the at least one battery pack.

4. The refuse vehicle of claim 1, wherein the electrically actuated refuse loading assembly comprises an electrically actuated front loader comprising an electrically actuated fork and an electrically actuated loader arm configured to load refuse into the vehicle body.

5. The refuse vehicle of claim 4, further comprising a carry can coupled to the electrically actuated front loader, the carry can further comprising an electrically actuated arm and an electrically actuated grabber configured to load refuse into the carry can.

6. The refuse vehicle of claim 1, wherein the electrically actuated refuse loading assembly comprises an electrically actuated side loader comprising an electrically actuated side arm and an electrically actuated grabber configured to load refuse into the vehicle body.

7. The refuse vehicle of claim 1, wherein the electrically actuated refuse loading assembly comprises an electrically actuated rear loader assembly configured to load refuse into the vehicle body.

8. The refuse vehicle of claim 1, wherein the vehicle body does not include any hydraulically powered components.

9. The refuse vehicle of claim 1, wherein the at least one processor is included in a power management module configured to regulate energy usage of the body systems and/or record and track electrical energy usage in each of the body systems.

10. A refuse vehicle comprising:
- a vehicle chassis;
- an electric vehicle body on the chassis, the body including:
  - a hopper;
  - a refuse storage container;
  - electrically powered body systems, the body systems comprising:
    - an electrically actuated refuse loading assembly configured to load refuse into the hopper; and an electrically actuated refuse packing assembly configured to remove refuse from the hopper and to pack said refuse in the storage container; and a plurality of electric actuators configured to electrically actuate the electrically powered body systems; and a power management module implemented by at least one computing system in electronic communication with the plurality of electric actuators, the power management module configured to cause the at least computing system to perform operations comprising regulating energy usage of the body systems and/or recording and tracking electrical energy usage of each of the body systems, wherein regulating energy usage and/or recording and tracking energy usage comprises:

determining, based at least in part on aggregated energy usage data received from a first electric actuator of the plurality of electric actuators, an aggregated amount of electrical energy used by the electrically actuated refuse loading assembly, the first electric actuator configured to electrically actuate the electrically actuated refuse loading assembly, the aggregated energy usage data comprising energy usage data that is aggregated, by the at least one computing system, over multiple cycles of the electrically actuated refuse loading assembly;

estimating a quantity of refuse contained within the hopper of the vehicle body based at least in part on: (i) operation of the electrically actuated refuse packing assembly, and (ii) the aggregated amount of electrical energy drawn by the electrically actuated refuse loading assembly; and in response to determining that the quantity of refuse contained within the hopper of the vehicle exceeds a threshold, causing electrical energy to be supplied to a second electric actuator of the plurality of electric actuators, the second electric actuator configured to electrically actuate the electrically actuated refuse packing assembly.

11. The refuse vehicle of claim 10, wherein the power management module is configured to trigger the electrically actuated refuse packing assembly to remove the refuse from the hopper and to pack said refuse in the storage container when the quantity of refuse in the hopper exceeds the threshold.

12. The refuse vehicle of claim 11, wherein;

estimating the quantity of refuse contained within the hopper comprises evaluating electrical usage of the of the electrically actuated refuse loading assembly to estimate a weight of refuse in the hopper; and determining that the quantity of refuse contained within the hopper of the vehicle exceeds the threshold comprises determining that the weight of refuse in the hopper exceeds a weight-threshold.

13. The refuse vehicle of claim 10, wherein:

the electrically actuated refuse loading assembly comprises an electrically actuated side loader comprising an electrically actuated side arm and an electrically actuated grabber; and estimating the quantity of refuse contained within the hopper comprises evaluating the electrical usage of the electrically actuated side arm to estimate a weight of refuse in the hopper.

14. The refuse vehicle of claim 10, wherein;

estimating the quantity of refuse contained within the hopper comprises evaluating video camera images of the hopper or optical sensor data to estimate a volume or a height of refuse in the hopper; and determining that the quantity of refuse contained within the hopper of the vehicle exceeds the threshold comprises determining that the volume of refuse in the hopper exceeds a volume threshold.

15. The refuse vehicle of claim 10, wherein:

the refuse vehicle further comprises a carry can coupled to an electrically actuated front loader, the carry can further comprising an electrically actuated arm and an electrically actuated grabber; and the power management module is configured to estimate a quantity of refuse in the carry can and to trigger the electrically actuated front loader to empty the carry can into the hopper when the quantity of refuse in the carry can exceeds a threshold.

16. The refuse vehicle of claim 15, wherein the power management module is configured to evaluate electrical usage of the of the electrically actuated arm to estimate a weight of refuse loaded into the carry can and actuate the electrically actuated front loader when the weight of refuse loaded into the carry can exceeds the threshold.

17. The refuse vehicle of claim 15, wherein the power management module is configured to evaluate video camera images of the refuse in the carry can or optical sensor data to estimate a volume of refuse in the carry can and actuate the electrically actuated front loader when the volume of refuse loaded into the carry can exceeds the threshold.

18. The refuse vehicle of claim 17, wherein the power management module is configured:

process video data to estimate a load in a refuse container; and process said estimated container load to determine an actuation speed of the electrically actuated refuse loading assembly when lifting and emptying the refuse container.

19. The refuse vehicle of claim 18, wherein the power management module is configured to measure energy usage in each of the body systems during refuse collection operations.

20. The refuse vehicle of claim 19, wherein the power management module is configured to provide substantially real-time instructions to a vehicle operator, said instructions including recommendation to improve vehicle energy efficiency, said instructions provided via a driver interface.

21. The refuse vehicle of claim 19, wherein the power management module is configured to provide an aggregated report of said energy usage at predetermined time intervals.

22. The refuse vehicle of claim 21, wherein:

the power management module is configured for two-way electronic communication with a cloud-based computing system; and the power management module is configured to upload the electrical energy usage to a cloud database.

23. The refuse vehicle of claim 19, wherein the power management module is configured to flag electrical energy usage that falls outside of corresponding energy usage threshold values or energy usage norms.

24. The refuse vehicle of claim 10, wherein the power management module is configured to automatically block use of one or more of the electrically powered body systems when remaining battery life falls below a battery threshold.

25. The refuse vehicle of claim 10, wherein the vehicle body further comprises at least one rechargeable battery system configured to provide electric power to the body systems.

26. The refuse vehicle of claim 10, further comprising charging rails deployed on a roof of the vehicle body.

27. The refuse vehicle of claim 10, further comprising at least one motion energy generator deployed on the vehicle body and configured to convert mechanical energy of uneven vehicle motion into electrical energy for charging a vehicle battery.

28. The refuse vehicle of claim 10, further comprising solar collection components deployed on the vehicle body and configured to convert solar energy into electrical energy for charging a vehicle battery.

29. The refuse vehicle of claim 10, further comprising wind collection components deployed on the vehicle body and configured to convert wind energy into electrical energy for charging a vehicle battery.

30. The refuse vehicle of claim 10, wherein the vehicle chassis is a fully-electric vehicle chassis.

31. The refuse vehicle of claim 10, comprising at least one rechargeable battery pack configured to provide electric power to the electrically powered body systems, wherein:

the chassis comprises a chassis frame; and the at least one rechargeable battery pack is deployed on an underside of the vehicle body between adjacent rails in the chassis frame.

32. The refuse vehicle of claim 31, wherein the chassis comprises an internal combustion engine, the internal combustion engine comprising an alternator electrically connected with and configured to recharge the at least one battery pack.

* * * * *